Patented Nov. 28, 1939

2,181,454

UNITED STATES PATENT OFFICE 2,181,454

PROCESS OF VULCANIZING RUBBER

Henri Martin Guinot, Niort, Deux-Sevres, France, assignor to Les Usines de Melle, Melle, France, a corporation of France No Drawing. Application September 29, 1936, Serial No. 103,203. In France October 7, 1935

7 Claims. (Cl. 260—796)

It is already known to employ as vulcanization accelerators the products resulting from the condensation of aliphatic aldehydes and amines and, among other patent specifications, British specification No. 180,978 of January 18, 1922, gives numerous examples of what can be tried in that direction. However, the numerous modifications which have since then been made in the method of manufacture of this kind of product and which have been described in various specifications, show, as is acknowledged by numerous authors, that very definite products were not obtained (compare German specification No. 478,948 of March 8, 1926; British specification No. 265,930 of December 29, 1926; and U. S. patents Nos. 1,780,149 and 1,780,326).

Thus, certain specifications go so far as to describe the products of condensation of one molecule of amine with 26 molecules of aldehyde (U. S. patent No. 1,850,716); this does not however preclude the discovery of numerous examples comprising intermediate figures.

In the presence of such surprising results, it might be supposed that in similar reactions the greater part of the aldehyde has simply been condensed with itself by aldolization and then crotonization without there being any real combination with the amine. This postulate is all the more plausible since very small quantities of amines are, as is known, sufficient to produce the aldolization of aliphatic aldehydes. This interesting property has, as a matter of fact, enabled a particularly advantageous novel synthesis of aldols to be worked out (see French specification No. 774,079 of June 2, 1934).

It has, in fact, been ascertained that the condensation of aliphatic aldehydes with primary aliphatic amines can be carried out with the elimination of water so as to produce a small number of definite products which differ among themselves particularly in their boiling points and their nitrogen content. Generally speaking, the product of condensation of one molecule of amine with one molecule of aldehyde (product "A"), the product of condensation of one molecule of amine with two molecules of aldehyde (product "B") and, finally, isomeric products and polymers of the latter (product "C"), can be isolated, these products being characterized by the same nitrogen content but by higher mean boiling points and molecular weights. These three products have very definite alkaline properties and change the colour of bromothymol-blue and even that of phenol-phthalein. They can be neutralized and can give salts even with weak acids.

Their respective activities as vulcanization accelerators vary considerably inter se. The product "C" is by far the most active and its efficacy is such that it can be utilized very advantageously, in the free state or in the form of a salt, as a super-accelerator.

These differences in activity are shown in the following table which gives the vulcanization time necessary with each of the products in order to obtain substantially equal dynamometric qualities, the quantities and qualities of the rubbers subjected to vulcanization, their content of sulphur and of accelerator, and the temperatures, being the same in all cases. The amine and the aldehyde selected for preparing this table are butylamine and butyraldehyde.

| Accelerator | Weight of accelerator per 100 gms. of rubber | Vulcanization time | Temperature | Dynamometric qualities | |
|---|---|---|---|---|---|
| | | | | Resistance to breaking | Elongation at the breaking point |
| | Grams | Minutes | °C. | Grams per sq. mm. | Percent |
| Product B (1 mol. amine+2 mols aldehyde) | 1 | 30 | 143 | 2,500 | 820 |
| Product A (1 mol. amine +1 mol aldehyde) | 1 | 20 | 143 | 2,200 | 805 |
| Product C (isomers+polymers of B) | 1 | 10 | 143 | 2,400 | 805 |

Moreover, the product "C", notwithstanding its considerable efficacy, does not, as do many other accelerators, show a tendency to over-sulfuration or to premature vulcanization, since its action is almost zero below 110° C. Moreover, it has an anti-oxygen action which ensures a good "ageing" for manufactured articles.

The present invention, which is based upon what has been set forth above, has for its subject matter not only the novel vulcanization accelerators (and especially the particularly active "C" products), but also the process for producing these accelerators.

In accordance with the preferred manner of carrying it out the process according to the present invention consists essentially in causing a primarily aliphatic amine to flow slowly into an aliphatic aldehyde in the proportion of one molecule of amine to two molecules of aldehyde with vigorous agitation and with cooling so that the mass is kept at a low temperature notwithstanding the evolution of heat due to the condensation which is very exothermic. The lower the molecular weight of the product treated and the greater its reactivity, the lower is the working temperature to be utilized.

The various products of the reaction (products "A", "B" and "C") are then separated. The most practical method consists in taking advantage of the difference between their boiling points and involves subjecting the mixture to a distillation, if required, at a pressure different from the atmospheric pressure. Obviously, the various products can be isolated individually, or simply the product "C" can be isolated from the reaction mixture, by taking advantage of distinctive properties of these products other than their boiling points.

The following examples, which are not limitative, will enable the mechanism of the process of the present invention to be well understood.

Example 1

146 gms. of monobutylamine (or 2 molecules) are added drop by drop to 288 gms. of butyraldehyde (or 4 molecules) kept at 0° C. by a freezing mixture. After allowing to stand for a few hours, the water which is formed is separated by decantation and the product is dried; if required, the distillation may be carried out at a reduced pressure. There are then separated, at a pressure of 20 mms., 34.8 grams of a product distilling at 55° C. and containing 11.3% of nitrogen (product "A": 1 molecule of amine+1 molecule of aldehyde), traces of a product boiling at 115° C. and containing 7.9% of nitrogen (product "B": 1 molecule of amine+2 molecules of aldehyde), and 295 gms. of a product distilling between 120 and 180° C., containing 7.8% of nitrogen and consisting of isomers and polymers of the product "B". This product, "C" constitutes the super-accelerator which it is principally desired to obtain.

It should be observed that the product "B", which is regarded as a normal condensation product of 1 molecule of amine with 2 molecules of aldehyde, has the formula

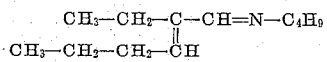

because it is identical with the product obtained by condensation of one molecule of monobutylamine with one molecule of ethyl hexanal, which is an aldehyde obtained by the aldolization and crotonization of 2 molecules of butyraldehyde and has, as is known, the formula

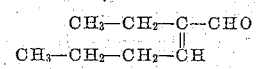

In this condensation operation, the temperature plays an important part and it has been found that, if a high temperature is worked with, the content of product "C" diminishes whilst the content of products "A" and "B" increases, as shown by the following observations relating to 100 gms. of total products worked with.

|  | Product "A" | Product "B" | Product "C" | Water |
|---|---|---|---|---|
|  | Grams | Grams | Grams | Grams |
| Condensation at boiling point | 6.5 | 28 | 33.7 | 20 |
| Condensation without cooling | 18.7 | Traces | 55.5 | 21 |
| Condensation at 0° C | 7.3 | Traces | 72 | 20 |

It is seen that, by working at 0° C., the product "C" forms 91% of the total of the products "A", "B" and "C" obtained.

Example 2

2.5 molecules of monobutylamine are condensed with 5 molecules of propanal at −20° C.; after separating the water that is formed, the product is distilled at a pressure of 50 mms. and there is obtained in this product the following relative contents of products "A", "B" and "C".

|  | Condensation at −20° C. |
|---|---|
|  | Percent |
| Product "A" (B. P. 62° C., nitrogen 12%) | 25.9 |
| Product "B" (B. P. 115° C., nitrogen 9.3%) | 10.9 |
| Product "C" (B. P. above 120° C., nitrogen 9.3%) | 62 |

Generally speaking, the "C" products are rather viscous liquid products. On the other hand, their salts with weak acids, which salts are obtained by neutralizing them with the stoichiometric quantity of acid, are products of a pasty consistency; this form often enables a better incorporation of the accelerator in the rubber to be vulcanized, an easier proportioning of the accelerator, and frequently a more convenient manipulation, to be effected.

The following examples show the results obtained with the super-accelerators described, which are used in the free state or in the form of salts.

Example a

To 100 parts of rubber there are added 0.5 part of stearic acid, 0.8 part of zinc oxide, 1.8 parts of sulphur and 0.8 part of the liquid super-accelerator "C" derived from butylamine and butyraldehyde.

After vulcanizing for 8 minutes at 140° C., the products have the following dynamometric qualities:

Resistance to breaking__gms. per sq. mm__ 2200
Elongation at the breaking point
                        per cent__ 850

Example b

To 100 parts of rubber there are added 2 parts of zinc oxide, 2.5 parts of sulphur, 1 part of stearic acid and 2.5 parts of a solid accelerator consisting of the stearate of the product "C" which has been derived from the butyraldehyde-butylamine condensation.

After vulcanizing for 10 minutes at 140° C., the manufactured products have a resistance to breaking of 2200 gms. per sq. mm. and an elongation of 860% at the breaking point.

It is evident that various modifications may be made in carrying out the process described above without departing from the scope of the invention. Thus, in particular, there may be employed as a weak acid for neutralizing the accelerators, not only stearic acid, but, for example, other fatty acids such as palmitic acid, oleic acid, ricinoleic acid, etc.

What I claim is:

1. A process which comprises incorporating with a vulcanizable rubber composition an accelerator consisting of the reaction product having a boiling point between approximately 120° C. and 180° C. at a pressure of 20 millimeters obtained by interacting an aliphatic amine with an aliphatic aldehyde in the proportion of one molecule of amine to two molecules of aldehyde at a temperature between +5° C. and −20° C., separating said reaction product by fractionation from the mixture of reaction products obtained and then vulcanizing.

2. A process which comprises incorporating with a vulcanizable rubber composition an accelerator consisting of the reaction product having a boiling point between approximately 120° C. and 180° C. at a pressure of 20 millimeters obtained by interacting an aliphatic amine with an aliphatic aldehyde in the proportion of one molecule of amine to two molecules of aldehyde at a temperature between +5° C. and —20° C., separating said reaction product by fractionation at a sub-atmospheric pressure from the mixture of reaction products obtained and then vulcanizing.

3. A process which comprises incorporating with a vulcanizable rubber composition an accelerator consisting of the reaction product having a boiling point between approximately 120° C. and 180° C. at a pressure of 20 millimeters obtained by interacting an aliphatic amine with an aliphatic aldehyde in the proportion of one molecule of amine to two molecules of aldehyde at a temperature between +5° C. and —20° C. with vigorous agitation, separating said reaction product by fractionation from the mixture of reaction products obtained and then vulcanizing.

4. A process which comprises incorporating with a vulcanizable rubber composition an accelerator consisting of the reaction product having a boiling point between approximately 120° C. and 180° C. at a pressure of 20 millimeters obtained by interacting monobutylamine with butyraldehyde in the proportion of one molecule (73 parts by weight) of monobutylamine to two molecules (144 parts by weight) of butyraldehyde at a temperature of substantially 0° C., drying the mixture of reaction products, separating said reaction product by distillation at a pressure of substantially 20 mms. from the mixture of reaction products obtained and then vulcanizing.

5. A process which comprises incorporating with a vulcanizable rubber composition an accelerator consisting of the reaction product having a boiling point between approximately 120° C. and 180° C. at a pressure of 20 millimeters obtained by interacting monobutylamine with propanal in the proportion of one molecule of monobutylamine to two molecules of propanal at a temperature about —20° C., separating said reaction product by distillation at a pressure substantially of 50 mms. from the mixture of reaction products obtained and then vulcanizing.

6. A process which comprises incorporating with a vulcanizable rubber composition an accelerator consisting of the reaction product having a boiling point between approximately 120° C. and 180° C. at a pressure of 20 millimeters obtained by interacting an aliphatic amine with an aliphatic aldehyde in the proportion of one molecule of amine to two molecules of aldehyde at a temperature between +5° C. and —20° C., separating said reaction product by fractionation from the mixture of reaction products obtained treating said product with a weak acid from the group consisting of stearic acid, palmitic acid, oleic acid and ricinoleic acid and then vulcanizing.

7. A process which comprises incorporating with a vulcanizable rubber composition an accelerator consisting of the reaction product having a boiling point between approximately 120° C. and 180° C. at a pressure of 20 millimeters obtained by interacting an aliphatic amine with an aliphatic aldehyde in the proportion of one molecule of amine to two molecules of aldehyde at a temperature between +5° C. and —20° C., separating said reaction product by fractionation from the mixture of reaction products obtained treating said product with a stoichiometric quantity of a weak acid and then vulcanizing.

HENRI MARTIN GUINOT.